(12) United States Patent
Viitamäki et al.

(10) Patent No.: US 7,904,023 B2
(45) Date of Patent: Mar. 8, 2011

(54) METHOD FOR SAVING POWER IN A WIRELESS TERMINAL AND A TERMINAL

(75) Inventors: Marko Viitamäki, Oulu (FI); Heikki Kesti, Oulu (FI); Timo Nisula, Oulu (FI); Marko Kainulainen, Oulu (FI); Kristian Rosberg, Oulu (FI); Antti Lilja, Oulunsalo (FI); Harri Lilja, Oulunsalo (FI); Jari Vallström, Oulu (FI); Janne J. Kallio, Pattijoki (FI); Mika Maarala, Oulu (FI); Kai Nybacka, Ii (FI); Juha Väänänen, Kiiminki (FI)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 12/322,465

(22) Filed: Feb. 2, 2009

(65) Prior Publication Data

US 2009/0149127 A1    Jun. 11, 2009

Related U.S. Application Data

(62) Division of application No. 10/821,106, filed on Apr. 8, 2004, now Pat. No. 7,660,578.

(30) Foreign Application Priority Data

May 2, 2003    (FI) .................................... 20030660
Dec. 22, 2003   (EP) .................................... 03396116

(51) Int. Cl.
    *H04B 7/00*    (2006.01)
(52) U.S. Cl. ...................... 455/41.2; 455/41.1; 455/41.3; 455/574

(58) Field of Classification Search .................. 370/328, 370/449, 431
See application file for complete search history.

(56) References Cited

U.S. PATENT DOCUMENTS

| | | | |
|---|---|---|---|
| 5,553,076 A | 9/1996 | Behtash et al. | 370/95.3 |
| 6,445,932 B1 | 9/2002 | Soini et al. | 455/556 |
| 2002/0169990 A1 | 11/2002 | Sherburne, Jr. | 713/300 |
| 2003/0036354 A1 | 2/2003 | Lee et al. | 455/41 |
| 2003/0040344 A1 | 2/2003 | Shteyn et al. | 455/573 |
| 2003/0119446 A1* | 6/2003 | Fano et al. | 455/41 |
| 2003/0148752 A1 | 8/2003 | Chen | 455/343 |
| 2004/0128310 A1 | 7/2004 | Zmudzinski et al. | 707/102 |
| 2004/0176065 A1 | 9/2004 | Liu | 455/343.1 |
| 2004/0179545 A1* | 9/2004 | Erola et al. | 370/449 |
| 2004/0203737 A1 | 10/2004 | Myhre et al. | 455/426.1 |
| 2005/0013264 A1 | 1/2005 | Sundberg | 370/328 |
| 2006/0030307 A1 | 2/2006 | Cadieux et al. | 455/418 |
| 2006/0089119 A1 | 4/2006 | Lipasti et al. | 455/410 |
| 2006/0183423 A1 | 8/2006 | Johansson et al. | 455/41.2 |

FOREIGN PATENT DOCUMENTS

| | | |
|---|---|---|
| EP | 1 089 578 A2 | 4/2001 |
| EP | 1 199 879 A2 | 4/2002 |
| KR | 2003/012635 A | 2/2003 |
| WO | WO-02/47321 A2 | 6/2002 |
| WO | WO-02/075517 A2 | 9/2002 |

\* cited by examiner

*Primary Examiner* — David Q Nguyen
(74) *Attorney, Agent, or Firm* — Harrington & Smith

(57) ABSTRACT

The object of the invention is a method for controlling the power saving properties in a terminal, which utilizes cellular phone technology and short range radio frequency wireless communication features in order to increase the operative life of the batteries, and a terminal utilizing the method. In the method of the invention the activity state of the short range wireless communication utilization in the terminal determines the level of the short range wireless communication power save mode.

21 Claims, 7 Drawing Sheets

METHOD FOR SAVING POWER IN A WIRELESS TERMINAL AND A TERMINAL

CROSS-REFERENCE TO A RELATED PATENT APPLICATION

This application is a divisional of U.S. patent application Ser. No. 10/821,106, filed Apr. 8, 2004, now U.S. Pat. No. 7,660,578 which claims priority to a Finnish Patent Application No. 20030660, filed on May 2, 2003, and to a European Patent Office Application No. 03396116.0, filed on Dec. 22, 2003, from which the above-identified Divisional Application claims priority.

The current invention relates to a method for controlling the power saving properties of wireless short range radio frequency communication, such as WLAN or Bluetooth, between a first device and a second device in order to increase the operative life of the batteries in a device, wherein at least one of the devices utilizes cellular phone technology. The current invention also relates to a device and device arrangement for controlling the power saving properties of said wireless radio frequency communication.

BACKGROUND OF THE INVENTION

The devices utilizing cellular phone technology, such as cellular phones and like, do more commonly possess additional integrated features for short range wireless communication with other devices. Generally these kinds of wireless communication technologies are meant for short distance low-power communication, such as communication in a single room or in a building. Two common such wireless technologies are Wireless Local Area Network (WLAN) and Bluetooth. As WLAN is generally a wireless Ethernet, Bluetooth in an open specification designed to replace cables between cell phones, laptops and other computing and communication devices within a 10 meter range. Generally they both operate at the same free 2.4 GHz or 5.7 GHz band.

Wireless Local Area Networks

Wireless local area networks become more common, and ever more terminals of different types can communicate in them. Traditionally wireless local area networks have been used mainly by portable computers or the like, but in an ever increasing manner wireless local area network properties are also included in other mobile terminals, for instance in different palm computers or mobile phones, such as in a GSM telephone or a communicator.

The present Wireless Local Area Networks (WLAN) are mainly based on the standard IEEE802.11. WLAN provides a network connection, which works over a relatively large area without inconvenient cables. Typically a WLAN operates for instance in an office environment or within a building, whereby it provides a possibility for e.g. portable computers or the like to make a wireless connection to the local area network of a company or other service provider. The device making a connection to the network can be for instance a separate connectable WLAN card, or the WLAN properties can be already integrated in the device.

A WLAN can either be formed of terminals, which use only wireless network connections, or it can exist as an extension of a wired network. A WLAN comprising only wireless terminals is usually called an ad hoc wireless local area network, as there are no other available communication methods in addition to the WLAN equipment to form the local area network. A network is called an infrastructure WLAN if other communication means are available in addition to the wireless communication techniques.

Thus the independent or ad hoc WLANs communicate only with other WLAN devices within their own wireless network environment. An ad hoc WLAN functions so that each network terminal can transmit data directly to another WLAN device within the same ad hoc network (point-to-point communication), and it does not require the data to pass other equipment. This is a useful solution when the network is formed within a small group, for instance for different meetings, whereby only a few work stations or other terminals are used. It is easy to establish an ad hoc network, and it does not require complicated network management, but it is not suitable for larger entities. An ad hoc network can be expanded by using an additional base station (AP, Access Point), whereby the base station functions as a repeater, which receives information and transmits this information to all WLAN terminals within its coverage area. This makes it possible to cover a larger area, even of the double size within the network.

Infrastructure WLAN refers to a wireless local area network, which is connected with at least one base station to a wired local area network. The area of the base station can include several terminals (Stations, STA), which can communicate with the whole network via the base station. If there is only one base station, then the network is called a Basic Service Set (BSS) WLAN. If the network contains several BSS sets, which together form a sub-network, then this is called an Extended Service Set (ESS) WLAN. A bus between base stations in the ESS networks is called a Distribution System (DS), which can be for instance an Ethernet system or a wireless system. The area covered by one base station is called a microcell. A WLAN comprising a distribution system, a base station or base stations with their microcells presents itself as one network of the IEEE802 standard to the higher layers of the OSI layer model. If a BBS forms an independent network without connections to a distribution system it is called Independent Basic Service Set (IBSS) (in an ad hoc network).

A WLAN according to the standard IEEE802.11 can be built using radio frequency techniques, such as narrow band radio frequency techniques and spread spectrum techniques, such as Frequency-Hopping Spread Spectrum (FHSS) or Direct Sequence Spread Spectrum (DSSS).

All stations (STA) within the coverage area of one BBS must be synchronized to the same clock, which is usually made with the aid of a Timing Synchronization Function (TSF). In infrastructure WLANs a base station (AP) maintains this timing and performs the TSF. The base station transmits periodically certain frames, which are called beacons, and which contain data about the TSF clock, so that other stations within the same BBS can be synchronized. A receiving station must always accept a beacon sent by the base station of the BBS which serves this station. If the TSF clock in the station differs from the received data in the beacon, then the receiving station sets its clock to the received value. The base station generates and transmits a beacon once in a time unit, which is called the Beacon Period.

In an IBSS network the TSF is realized by a distributed algorithm, which is realized by all members of the BBS. According to this algorithm each station of the BBS transmits beacons, and each station in the IBSS adjusts its clock on the basis of the timing of that beacon with a TSF value, which is later than the station's own value.

The base station shall define the timing for the entire BBS by transmitting beacons according to the aBeaconPeriod attribute within the base station. This defines a series of Target Beacon Transmission Times (TBTT), which exactly aBeaconPeriod time units apart. Time zero is defined to be a TBTT with the beacon being Delivery Traffic Indication Message (DTIM) and which is transmitted at the beginning of each Contention-free Period (CFP). At each TBTT the base station shall schedule the beacon as the next frame for transmission.

In a wireless local area network a station (terminal) can switch into a Power Save (PS) mode. For instance in infrastructure WLAN a station then informs the base station about this by using the power management bits in the Frame Control field. Then the base station will not arbitrarily transmit data (MSDU, MAC Service Data Unit) to such stations, but it buffers the data and transmits it only at a certain moment. Such stations, to which data has been buffered in the base station, are marked in the Traffic Indication Map (TIM), which is included as one element in each beacon created by the base station. By receiving and interpreting the TIM a station will detect that there exists buffered data intended for it. Stations operating in the power management mode will periodically listen to the beacons, according to what is defined by the parameters ListenInterval and ReceiveDTIM of the station's power management.

When a station in power management mode detects that data for it is buffered in the base station it will transmit a short PS-Poll frame to the base station, which in turn will immediately respond by the data in question, or it states that it has received the PS-Poll and will transmit the data later on. If a TIM informing of buffered data is transmitted during a CFP, then a station in the power save mode will not transmit a PS-Poll frame, but remains active until the buffered data has been received (or the CFP is finished). If a station of the BSS is in the power save mode the base station will buffer all broadcast and multicast MSDUs and send them to all stations immediately after the next beacon, which contains a DTIM transmission.

A station (STA) remains in the current power management mode until it informs the base station about a changed power management mode initiated by the station itself by successfully exchanging frames. The power management mode must not change during a period of frame exchange.

The station can have two different power states: awake, whereby it is fully powered, or doze, whereby the station is not able to transmit or receive, and whereby it consumes very little power. The manner in which the station switches between these two states depends on the station's power save mode; the modes are the Active Mode (AM) and the Power Save (PS) mode.

In the active mode the station is able to receive frames at any time, and it is in the state "awake".

In the power save mode the station listens to certain beacons (depending on the ListenInterval parameter of the MLME-Associate.request element) and transmits PS-Poll frames to the base station, if the TIM element in the most recent beacon shows that data (MSDU) for the station has been buffered. The base station transmits buffered MSDUs intended for a station in power save mode only as a response to a PS-Poll from this station, or during CFP if the station is a CF-Pollable PS-station. In the power save mode the station is in the doze state, and switches into the active state in order to receive beacons, to receive broadcast and multicast transmissions, which follow certain received beacons, to transmit, and to wait for responses to the transmitted PS-Poll frames or (concerning CF-Pollable stations) to receive contention-free transmissions or buffered MSDUs.

When a station is in the course of switching from the doze state to the 'awake' state in order to transmit it will first assess the state of the channel by a Clear Channel Assessment (CCA) procedure, until it detects a frame sequence where it can correctly set its Network Allocation Vector (NAV), or until a period corresponding to ProbeDelay expires.

TIM identifies those stations, which are about to receive traffic, which has been buffered in the base station. Further the TIM contains information about any expected broadcast/multicast traffic. The base station allocates an Association ID (AID) to each station. AID 0 (zero) is reserved to identify a buffered broadcast/multicast MSDU.

There are two types of TIM: TIM and DTIM. After a DTIM the base station transmits the buffered broadcast/multicast MSDUs using normal frame transmission rules, and before it transmits any unicast frames. The base station transmits a TIM in each beacon. During each DTIM period (DTIMPeriod) a TIM of the 'DTIM'-type is transmitted in the beacon instead of a normal TIM.

The stations in power save mode act in the following ways in order to receive, depending on whether it is a Contention Period (CP) or Contention-Free Period (CFP).

FIG. 1 shows the functions of a base station and stations in a case when a DTIM is transmitted always after two TIMs. The top segment of a line is the time axis, which shows the intervals between the beacons and between the DTIMs. The second segment of a line represents the base station's functions. The base station synchronises the beacons to be transmitted at each beacon interval, but the transmission of the beacons may be delayed, if there is traffic during the TBTT. This is marked in the figure with the text 'Busy Medium'. The third and fourth segments of a line represent stations, which are in different power save modes. Both stations switch on their receivers when they must listen to the TIMs. This is drawn in the figure with the aid of rising symbols representing the power of the receiver. For instance, the station shown on the third segment of a line switches on its receiver in order to receive the TIM transmitted already during the first beacon. The TIM shows that there is a buffered MSDU for the receiving, station. The receiving station generates a PS-Poll frame, which causes the transmission of the buffered data from the base station. Broadcast and multicast MSDUs are transmitted from the base station after a beacon containing a DTIM. The station shown on the fourth segment of a line operates in a state consuming extremely little power, and in the figure it switches on its receiver only once in order to receive a TIM.

When the Point Coordinator (PC) is inactive, and during CP when the PC is active, the station (STA) awakes from its doze state sufficiently early in order to receive the next agreed beacon. When the station detects that the AID bit corresponding to this station is set in the TIM, then the station starts a PS-Poll in order to obtain the buffered MSDU of a management frame. If more bits are set in the TIM the PS-Poll is transmitted after a random period. The station remains in the 'awake' state until it receives a response to its poll, or until it receives another beacon with a TIM indicating that the base station has buffered MSDUs or management frames for this station. If the AID bit corresponding to this station is set in the next TIM the station starts a new PS-Poll in order to obtain the buffered MSDU(s) or management frame(s). If the More Data field in the received MSDU or management frame shows that more traffic has been buffered for this station, then the station transmits a new poll at a suitable moment, until no more MSDUs or management frames are buffered for this station. If the ReceiveDTIM is true, then the station awakes from its doze state sufficiently early in order to receive each DTIM. A station receiving broadcast/multicast MSDUs remains in the 'awake' state until the More Data field or the broadcast/multicast MSDUs show that there are no more buffered broadcast/multicast MSDUs, or until it has received a TIM, which shows that there are no more buffered broadcast/multicast MSDUs.

In a BBS with an active PC the station awakes during the CFP to receive a beacon (containing the DTIM) at the beginning of each CFP. In order to receive broadcast/multicast MSDUs the station awakes sufficiently early in order to receive each DTIM, which may be transmitted during the CFP. A station receiving broadcast/multicast MSDUs remains in the 'awake' state until the More Data field of the broadcast/multicast MSDUs shows that there are no more buffered broadcast/multicast-MSDUs, or until it has received a TIM, which shows that there a no more buffered broadcast/multicast MSDUs. When a station detects that the AID bit corresponding to this station is set in the DTIM at the beginning of the CFP (or in the next TIM during CFP) it will remain in the 'awake' state during at least a portion of the CFP until the station receives a MSDU or management frame directed to it from the base station and the More Data field in the Frame Control field shows that no further traffic has been buffered. If the More Data field in the Frame Control field in the last MSDU or management frame received from the base station shows that there exists more buffered traffic for the station, then the station can remain in the 'awake' state when CFP is terminated, and then it can send PS-Poll frames during the CP in order to request these extra MSDUs or management frames, or the station can switch itself into the doze state during CP (except during TBTT when DTIMs are expected during CP) in order to wait for the start of the next CFP.

A station in the active state keeps its receiver continuously active, and it does not have to assess the traffic information part of the beacon.

The base station has an expiration function which removes buffered traffic, which has been buffered over an unreasonably long time. This function is based on the ListenInterval parameter of the MLME-Associate.request primitive of that station, for which the traffic is buffered.

The description above refers mainly to infrastructure WLAN systems. The power management in IBSS systems differs slightly from it, even if the basic idea is similar. The stations are synchronized, and information about multicast MSDUs and MSDUs to be transmitted to stations in the power save mode is first presented during that period when the stations are in the 'awake' state. The announcement is made with the aid of ad hoc Traffic Indication Messages (ATIM). A station in the power save mode listens to these messages so that it can determine whether it should stay in the 'awake' state.

When an MSDU is transmitted so that it is addressed to a certain station being in the power save mode, then the transmitting station first transmits an ATIM frame within the ATIM window, during which all stations are in the 'awake' state, also those in the power save mode. The ATIM window is defined as a specific period of time (defined by aATIMWindow), following a TBTT, and during which only beacons or ATIM frames shall be transmitted. The addressed ATIMs shall be acknowledged. If the station transmitting a directed ATIM does not receive an acknowledgement it shall execute the backoff procedure for retransmission of the ATIM. Multicast ATIMs shall not be acknowledged.

After the ATIM interval only those directed MSDUs, that have been successfully announced with an acknowledged ATIM, as well as the broadcast/multicast MSDUs announced by ATIMs shall be transmitted to the stations, which are in the power save mode. The transmission of these frames shall be done using the normal DCF access procedure.

Bluetooth

The Bluetooth (Trademark) standard (see Bluetooth specification) describes how low power radio transceivers can be used to remotely communicate over a range of tens of meters. These low power transceiver devices are already present in some mobile phones and can be used to allow a user input, such as a cordless headset, to be used remotely from the mobile phone. Communication between the headset and the phone occurs between a low power radio transceiver in the headset and the low power radio transceiver in the phone. A particular advantage of Bluetooth transceivers in mobile applications is that they have energy conservation modes which prolong battery life.

Two or more units sharing the same Bluetooth channel form a piconet. One Bluetooth unit acts as the master of the piconet, whereas the other unit(s) acts as slave(s). Up to seven slaves can be active in the piconet. Multiple piconets with overlapping coverage areas form a scatternet. Each piconet can only have a single master. However, slaves can participate in different piconets on a time-division multiplex basis. In addition, a master in one piconet can be a slave in another piconet. The piconets shall not be time- or frequency-synchronized. The piconet is synchronized by the system clock of the master. The master never adjusts its system clock during the existence of the piconet. The slaves adapt their native clocks with a timing offset in order to match the master clock.

Features are included into Bluetooth to ensure a low-power operation. These features are both at the microscopic level when handling the packets, and at the macroscopic level using certain operation modes. Three modes are described during the connection state (wherein the connection has been established and packets can be sent back and forth) which reduce power consumption: sniff mode with higher duty cycle, hold mode with lower duty cycle and park mode with the lowest duty cycle.

In active mode, the Bluetooth unit actively participates on the channel. The master schedules the transmission based on traffic demands to and from the different slaves. In addition, it supports regular transmissions to keep slaves synchronized to the channel. Active slaves listen in the master-to-slaves slots for packets.

In the sniff mode, the duty cycle of the slave's listen activity can be reduced. If a slave participates on an ACL link, it has to listen in every ACL slot to the master traffic. With the sniff mode, the time slots where the master can start transmission to a specific slave is reduced, i.e. the master can only start transmission in specified time slots. These so-called sniff slots are spaced regularly with a interval of $T_{sniff}$ (herein called 'sniff intervals'). To enter the sniff mode, the master shall issue a sniff command via the LM protocol.

During the connection state, the ACL link to a slave can be put in a hold mode. This means that the slave temporarily does not support ACL packets on the channel any more. With the hold mode, capacity can be made free to do other things like scanning, paging, inquiring or attending to another piconet. During the hold mode the slave unit keeps its active member address (AM_ADDR). Prior to entering the hold mode, master and slave agree on the time duration the slave remains in the hold mode. When the timer is expired, the slave will wake up, synchronize to the traffic on the channel and will wait for further master instructions.

When a slave does not need to participate on the piconet channel, but still wants to remain synchronized to the channel, it can enter the park mode which is a low-power mode with very little activity in the slave. In the park mode, the slave gives up its active member address (AM_ADDR). The parked slave wakes up at regular intervals to listen to the channel in order to re-synchronize and to check for broadcast messages. To support the synchronization and channel access of the parked slaves, the master establishes a beacon channel when one or more slaves are parked. The beacon channel serves four purposes: transmission of master-to-slave packets which the parked slaves can use for re-synchronization, carrying messages to the parked slaves to change the beacon parameters, carrying general broadcast messages to the parked slaves, and unparking of one or more parked slaves.

BRIEF DESCRIPTION OF THE INVENTION

Until now the wireless local area networks (WLAN) have been generally used mainly in portable computers or for instance in palm computers, where the WLAN has been the only wireless connection to the outside world for these devices. For instance portable computers are generally provided with Ethernet and modem interfaces, and for instance USB and Firewire interfaces, and possibly an infrared connection. Usually a separate card is installed for a WLAN interface, or the WLAN may be integrated. Common to these solutions is that WLAN is generally the only way to provide these devices with a wireless connection to an external network, mainly to the Internet.

However, currently the perception of a terminal is changing, and WLAN properties, as well as Bluetooth properties, can be added for instance to a mobile phone, which normally communicates with the aid of cellular phone techniques. Mobile phones and different devices of the 'communicator' type, having in addition to the mobile phone properties also other features, such as Internet features, will in certain circumstances benefit from the advantages provided by a wireless local area network. For instance, roaming has been tested between UMTS and WLAN networks. Roaming between two networks of different technologies enables movements in the coverage area of both networks, and at the same time it makes it possible to maximally utilize the transmission capacity of the networks. Seen in this light it is obvious that WLAN properties will become common in terminals of the mobile phone type, in other words in devices which in addition to the WLAN property also utilize at least cellular telephone technology, such as GSM or a future generation technology, such as CDMA2000, GPRS, WCDMA, EDGE or UMTS.

Very little interest has been directed to the power saving in WLAN, as the WLAN technology so far was used mainly in portable computers having in battery use an operating time, which regarding the power consumption is typically max. 12 to 20 hours. If the power used by WLAN reduces the operating time by e.g. one hour, it is not necessarily even detected. However, the power consumption is very important in such devices, for instance in mobile phones, where the operating time regarding the power consumption can be for instance 5 to 12 days and where the batteries are smaller than in computers. If the WLAN for instance consumes 20 mA, then the operating time of the mobile phone will be reduced to the level 18 hours-1 day. The relatively high consumption of WLAN may cause problems, because other power consumption in a mobile phone is relatively low. This must be solved for instance by developing the control of power saving properties of WLAN.

As the use of WLAN becomes more common there is further a risk that the amount of traffic in wireless local area networks becomes so high that it impedes an unhampered operation of the network. Thus it is advantageous to keep the WLAN traffic at a level as low as possible in order to avoid congestion. This can be solved by increasing the use of the power save mode in WLAN devices, which will reduce the load on the network.

Because both WLAN and Bluetooth utilize the same free 2.4 GHz or 5.7 GHz band and because both technologies are common, it is advantageous to keep the traffic of both communication technologies as low as possible for example to avoid interference between them. The same power saving issues described above for WLAN also exist on Bluetooth systems.

Moreover, with Bluetooth it is possible to create multipart systems, which include a cellular core unit 70, such as a mobile phone, and one or more of peripheral devices as shown in FIG. 7. For example one of the peripheral devices may be optimized for making basic phone calls 74, one of them for messaging and browsing 72 and one for imaging and music 76. All the peripherals may be connected to the core unit 70 with Bluetooth. The core unit itself does not necessarily need a display or user interface. As all the multipart devices are mobile handheld and/or portable terminals, their power consumption must be minimized in order to achieve better operation times with small batteries. The batteries used in such devices may be substantially smaller than in a cellular phone which makes the control of power consumption very important.

The object of this invention is to present a new method to control the radio frequency WLAN power saving properties in a device, which in addition to the WLAN utilizes at least cellular phone technology.

The objects of the invention are attained with a method wherein the activity state of the use of WLAN in a terminal defines the level of WLAN power saving.

The object of this invention is also to present a new method to control the Bluetooth power saving properties in a device, which in addition to the Bluetooth utilizes at least cellular phone technology.

The objects of the invention are attained with a method wherein the activity state of the use of user interface in a device defines the level of Bluetooth power saving.

As used herein the 'wireless communication' means a short range radio frequency wireless communication between two devices, such as WLAN or Bluetooth communication. Generally such short distance wireless radio frequency communication is performed on a free frequency, such as commonly used 2.4 GHz or 5.7 GHz band and it is designed for communication between devices, for example portable devices, in a relatively short distance apart, for example 10 meters or less even though longer ranges are possible in some cases.

The method and devices according to the invention to control the power saving properties of short range wireless communication in order to increase the operating time of batteries in a device are characterized in the independent claims. The dependent claims present some embodiments of the invention.

The basic idea of the invention is as follows. As it is important regarding power saving to keep the short range wireless communication, such as wireless local area network (WLAN) or Bluetooth, power consumption of a battery operated terminal or device, such as terminal of the mobile phone type or a peripheral device utilizing Bluetooth, as low as possible particularly when features utilizing said wireless communication are not in use, then it is possible on the basis of the usage level of such features to control the degree of wireless communication power save mode. When it is assumable that no applications utilizing said wireless communication are in use the terminal is switched into deeper power save mode regarding to said wireless communication. Then the terminal is relatively long periods in the power save mode, such as in a doze state and does not receive beacons within a certain period. If the terminal detects an event indicating activation of an application, which possibly will utilize said wireless communication, such as user input entry, it switches into a more active state regarding the wireless communication. There may be several states of power save modes ranging from fully active mode to fully inactive mode. These modes are specified in WLAN and Bluetooth specifications.

An advantage of the invention is that it saves power in battery operation, and thus it increases the operating time of a terminal utilizing wireless communication.

A further advantage of the invention is that it reduces wireless communication traffic, and thus it also reduces the load op the network.

A further advantage of the invention is that the batteries must be recharged or changed more seldom, which increases their service life.

DRAWINGS

The invention is described in detail below. The description refers to the enclosed drawings, in which FIG. 1 shows the function of the power save mode in infrastructure WLAN;

Figure 1:
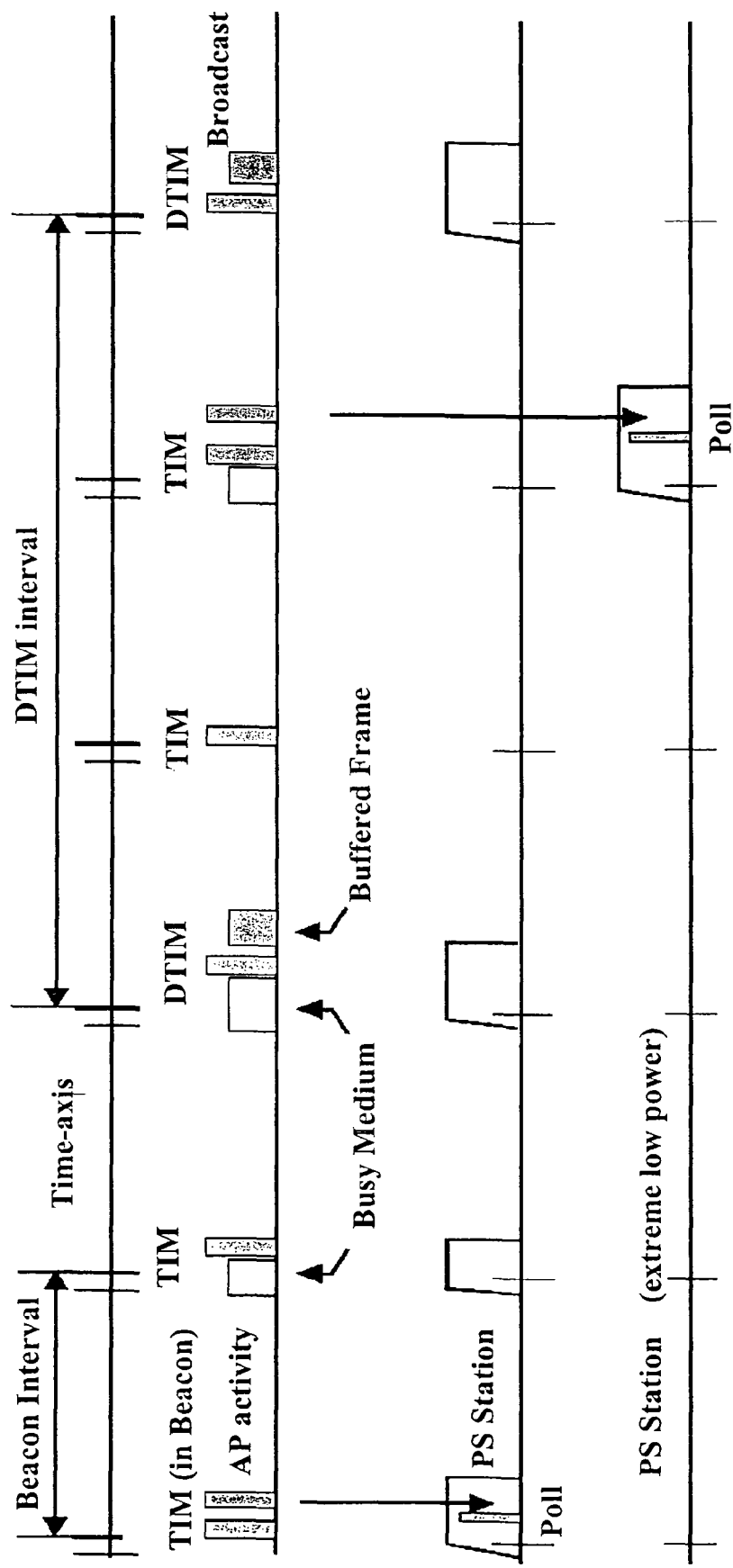

FIG. 1 was described earlier in connection with the description of prior art.

Figure 2:
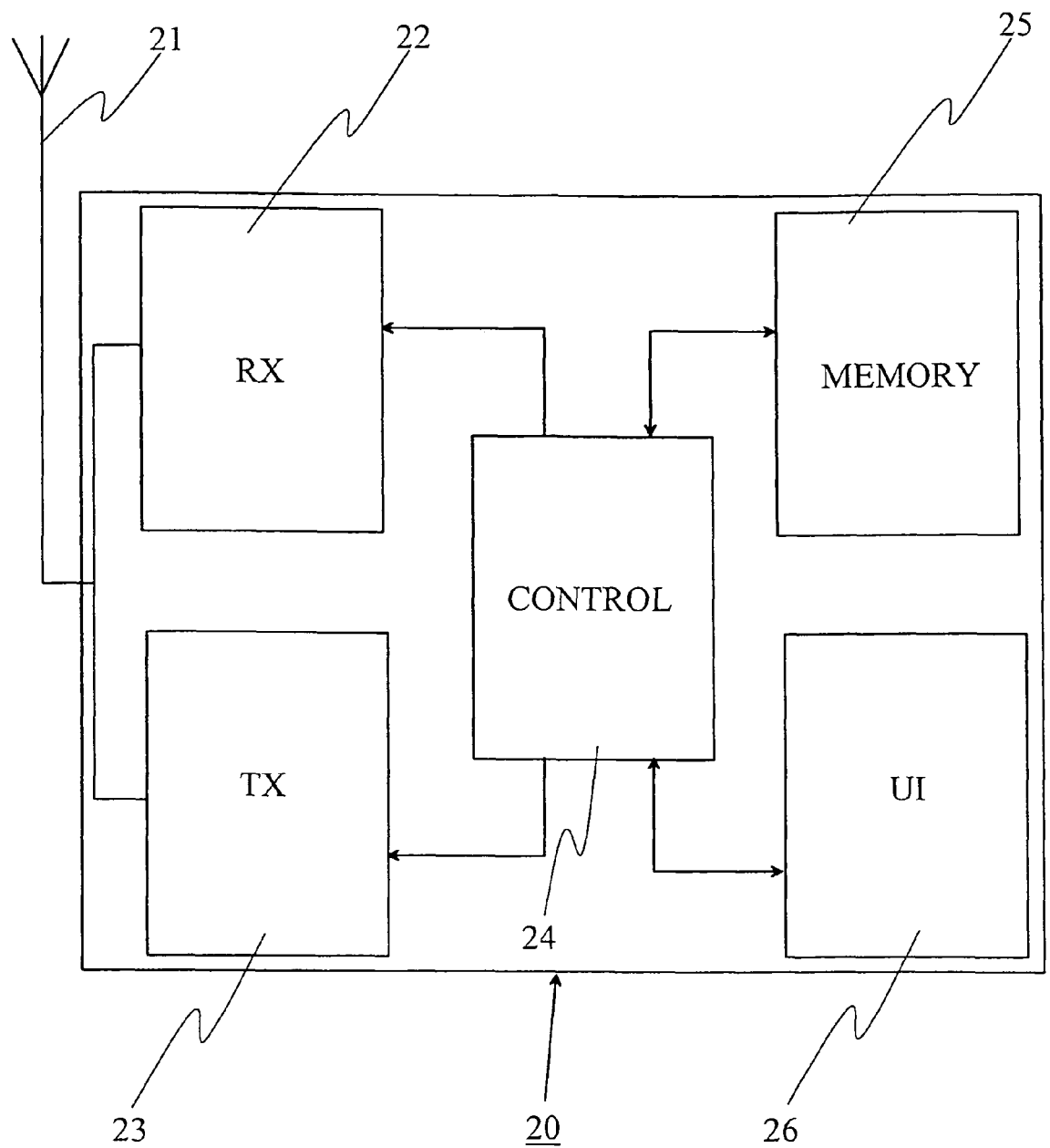
FIG. 2 shows schematically the functional units of a terminal.

Herein a terminal refers to a terminal, which is able to transmit and receive, and which has at least cellular telephone properties and short range wireless communication properties, such as wireless local area network (WLAN) properties or Bluetooth properties. A terminal of this kind is schematically exemplified in FIG. 2. The terminal 20 has a receiver 22 and a transmitter 23 advantageously connected to an antenna 21 for receiving and transmitting a radio frequency signal. Further the terminal has a control unit 24, a memory 25 and an user interface 26. The control unit 24 is connected to the receiver 22, to the transmitter 23, to the memory 25 and to the user interface 26, and it controls their functions. The control unit 24 has also means for controlling the terminal's 20 WLAN or Bluetooth properties, e.g. for controlling the power saving characteristics. When the control unit 24 uses the WLAN or Bluetooth power saving feature according to the invention it controls the operation and the activity of the receiver 22 and transmitter 23 on the basis of the current power save mode. The power save mode is determined for instance by information obtained from the user interface 26. The user interface can comprise for instance a power switch, a display and/or a keypad or other means for controlling the device, for instance a touch-sensitive display or voice control, but all of them are not necessary.

Figure 3:
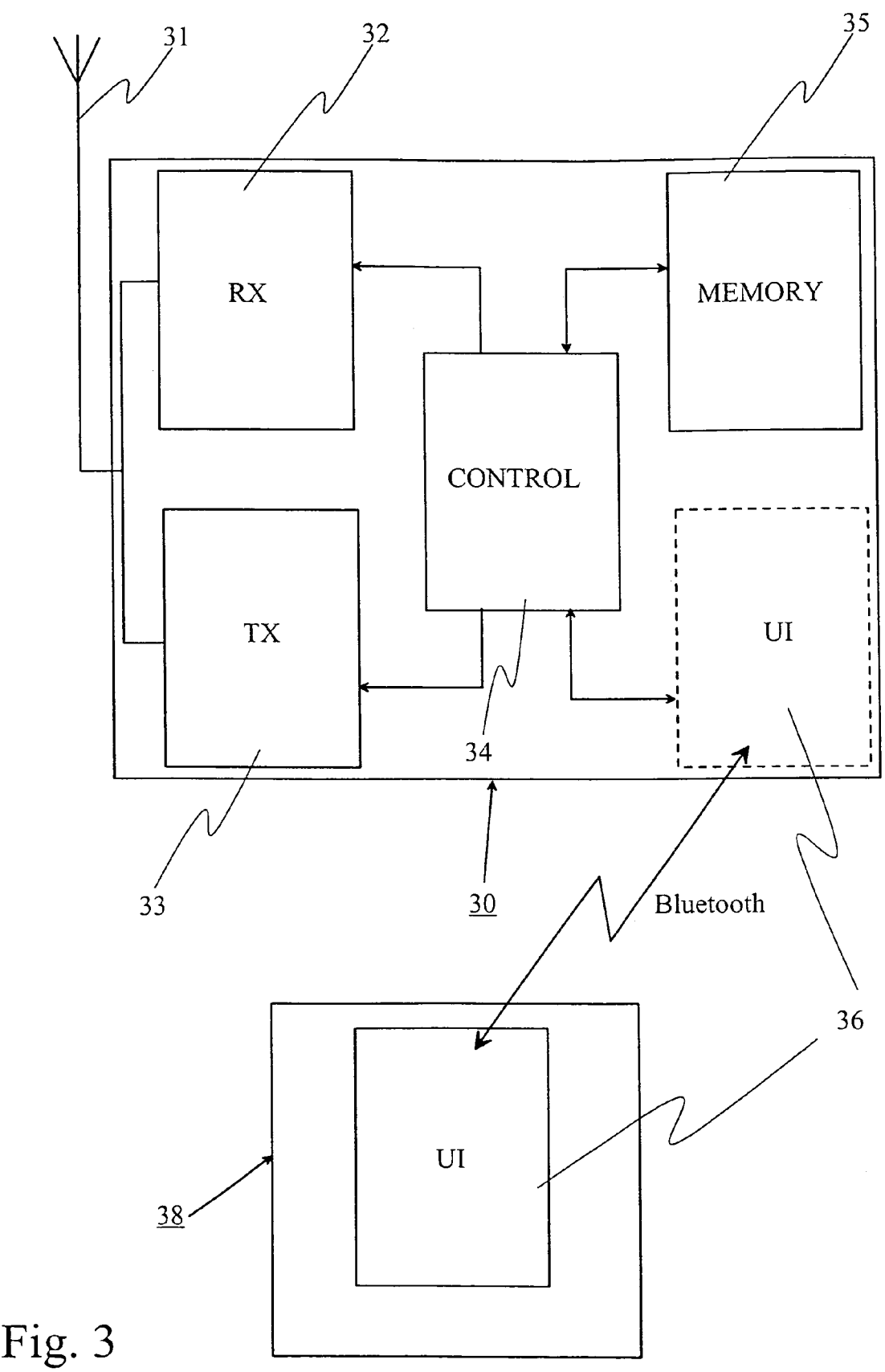
FIG. 3 shows schematically the functional units of a terminal casting the user interface to a peripheral device and the peripheral device.

An embodiment comprising a terminal acting as a core unit and a peripheral device remotely using the user interface from said core unit is schematically exemplified in FIG. 3. In this device arrangement the user interface 36, such as graphical user interface, is remote, i.e. it is casted from the terminal 30 (core unit, first device) to the peripheral device 38 (second device) with Bluetooth. The terminal 30 has a receiver 32 and a transmitter 33 advantageously connected to an antenna 31 for receiving and transmitting a radio frequency signal. Further the terminal has a control unit 34, a memory 35 and an user interface 36, which is casted to the peripheral unit 38. The control unit 34 is connected to the receiver 32, to the transmitter 33, to the memory 35 and to the user interface 36, and it controls their functions. The control unit 34 has also means for controlling the terminal's 30 Bluetooth properties, e.g. for controlling the power saving characteristics. The peripheral device 38 displays the remote user interface 36 which can be used by user. The functional parts such as receiver, transmitter, antenna, control unit and memory the peripheral device 38 usually needs for utilizing Bluetooth features are not shown in this figure.

DETAILED DESCRIPTION OF THE INVENTION

There are several methods for defining the control of the power saving options in short range wireless communication in a terminal, which in addition to said short range wireless communication uses at least cellular phone technology, such as in a mobile phone or in a mobile terminal of the communicator type, or in a peripheral device communicating with such terminal. Such methods include monitoring the activity state of the utilization of said short range wireless communication and events related to it, for instance monitoring the state of the hatch in devices provided with a hatch, or monitoring the activity, the data transfer or the use of applications utilizing the wireless communication. Also the user interface utilization, such as the state of a keypad lock or screen saver, may provide useful information for the method of the current invention.

It is characteristic for the method of the current invention that the activity state of the utilization of the short range wireless radio frequency communication, such as WLAN or Bluetooth, in a device defines the level of the power save mode of said short range wireless communication wherein active utilization of said short range wireless communication will decrease said level of the power save mode and/or less active utilization of said short range wireless communication will increase said level of the power save mode.

Figure 4A:
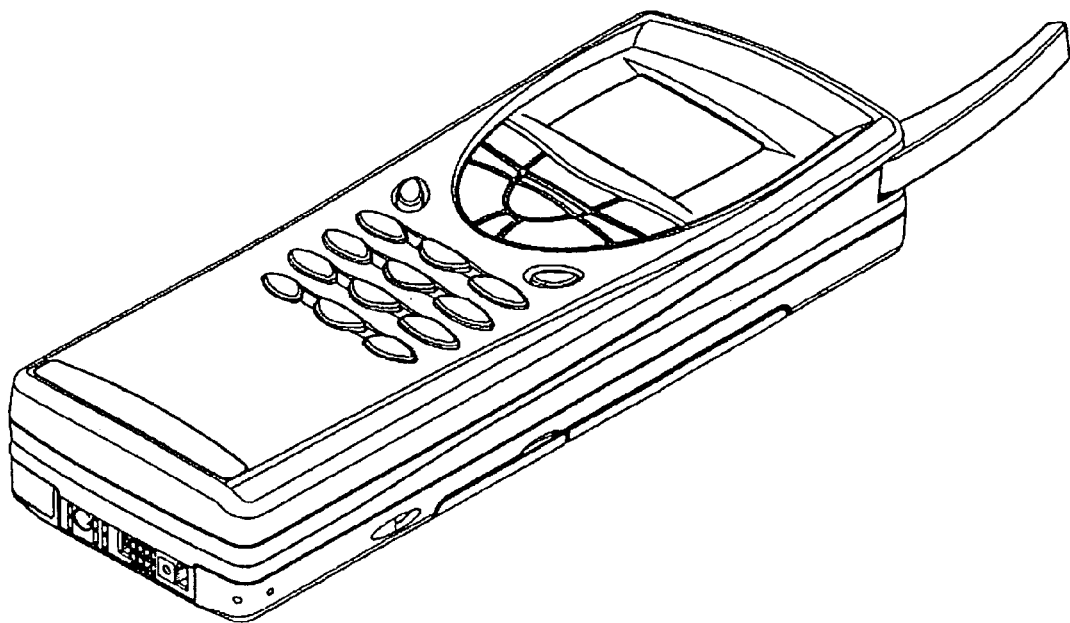
FIG. 4a shows a closed terminal provided with an opening mechanism.

FIG. 4a shows a mechanism, which can be opened and closed, in the closed state, which mechanism can be found in some WLAN or Bluetooth terminals, such as in certain mobile phone models, particularly in mobile stations of the communicator type, and in certain mobile phones. A mechanism of this type can also be a hatch, a cover or the like, which covers the keys. A device utilizing a screen saver for preventing accidental user input works basically the same way. When a mechanism of this type is closed, or a screen saver is activated or locked, the device is generally in a passive state, in other words applications using the WLAN or Bluetooth features or other features in the device are not used, or cannot be used because the keys and/or the display needed for the use are covered. When the hatch or closing mechanism is closed the terminal (station) will then in an embodiment of the invention switch into the power save mode, in which it will not receive the beacons transmitted by the base station during a certain period, for instance during the next 30 frames. A deep power saving state of this kind is presented for instance on the bottom line of a segment in FIG. 1. After this doze state the terminal switches into the active state and controls whether the base station has buffered data for it. If not, then the terminal again switches into the doze state as before. If data has been buffered the device can switch into a more active state and begin to receive data.

Figure 4B:
FIG. 4b shows an opened terminal provided with an opening mechanism.

FIG. 4*b* shows a terminal with an opened mechanism, which can be opened and closed, whereby the device is switched into the active state, or into a power save mode which is more active than, previously, whereby the device receives beacons more often than when the hatch or mechanism is closed. When the device is in the power save mode it dozes for instance 95% of the time, and during the rest of the time it uses about 4% to listen and only 1% to transmit.

Figure 5:
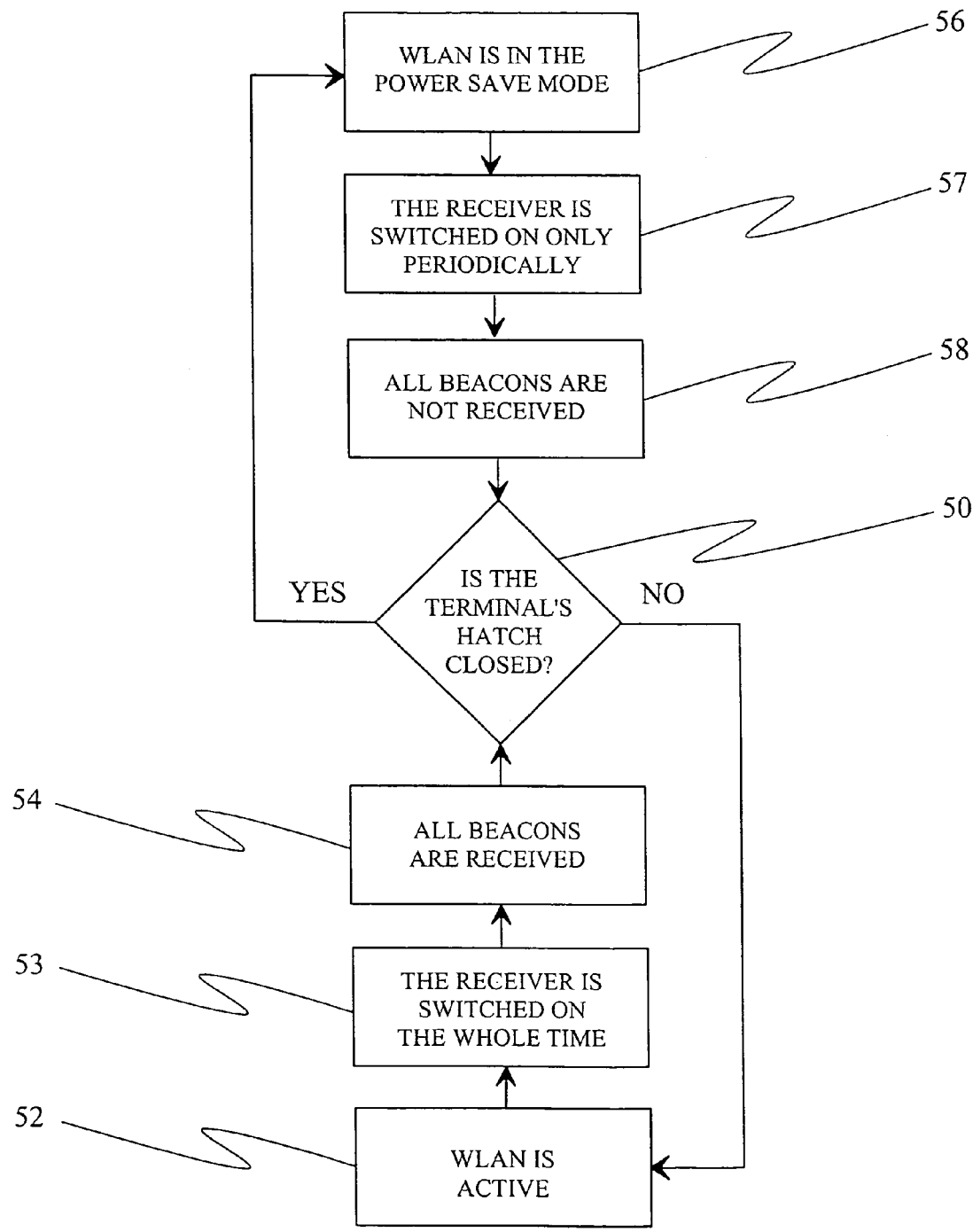
FIG. 5 shows the different phases of the WLAN power saving according to the invention.

FIG. 5 shows in a flow diagram an example how the power saving state of WLAN is chosen according to the invention on the basis of the state (50) of the terminal's hatch mechanism, which can be opened and closed. When the system detects that the terminals hatch or mechanism is closed the terminal's WLAN switches into a power saving state (56), whereby its receiver is switched on only periodically (57) and it will not receive all beacons (58). When the system again detects that the terminal's hatch or mechanism is opened the WLAN switches into more active state (52) and its receiver may be continuously switched on (53) whereupon it receives all the beacons (54).

Figure 6:
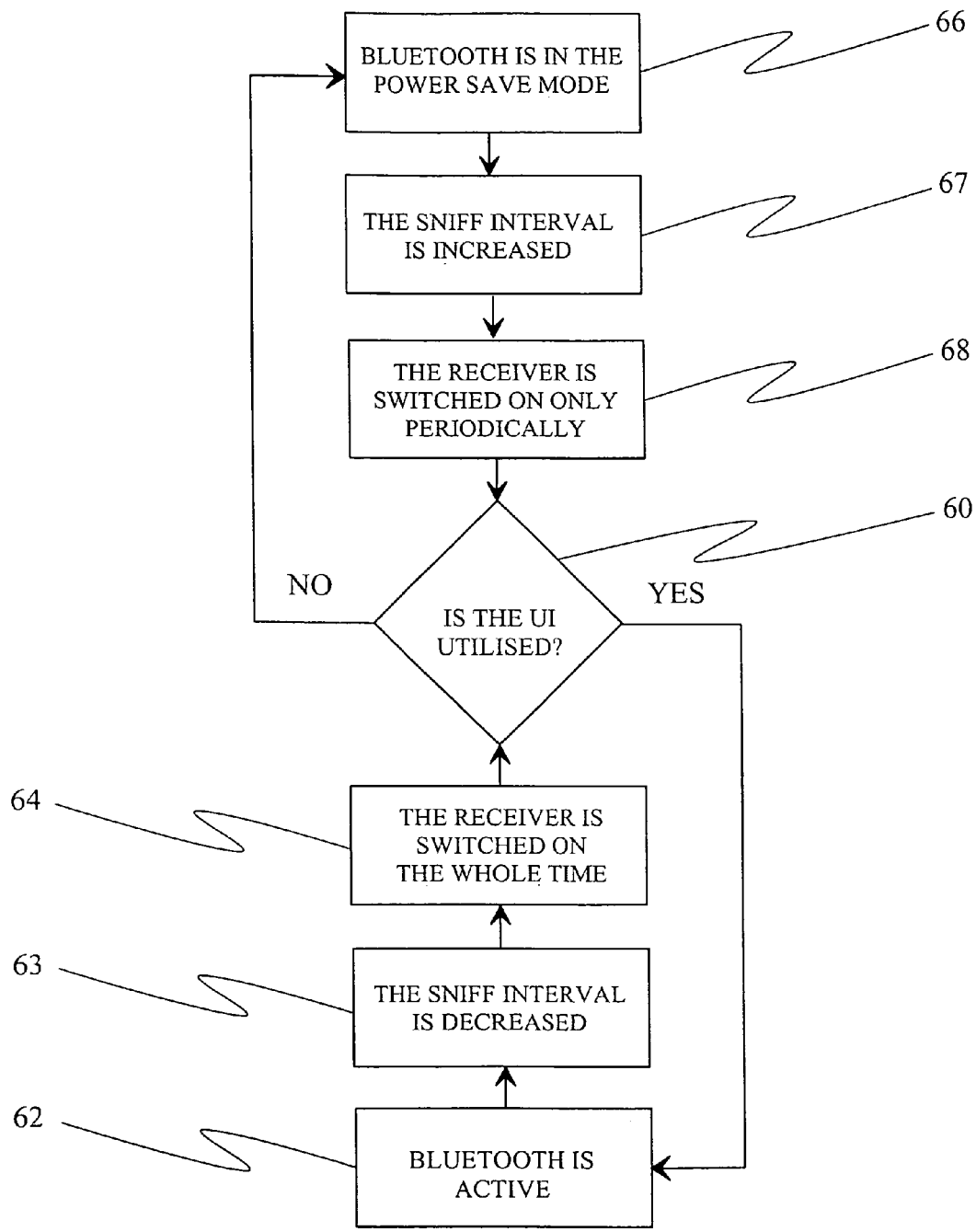
FIG. 6 shows the different phases of the Bluetooth power saving according to the invention.

FIG. 6 shows in a flow diagram an example how the power saving state of Bluetooth is chosen according to the invention on the basis of the state (60) of the user interface utilization. When the system detects that the user interface is not utilized, e.g. no user input is detected for a certain previously chosen period of time or a screen saver activates, the terminal's Bluetooth switches into a power saving state (66), whereby its sniff interval is increased (67) and its receiver is switched on only periodically (68). When the system again detects that that the user interface is utilized the Bluetooth switches into more active state (62) and its sniff interval is decreased (63) whereupon its receiver may be continuously switched on (64) or at least the interval of said 'on'-periods is decreased.

However, it is not necessary for the WLAN to be in a fully active state when the terminal's hatch or mechanism is open. According to the inventive idea it suffices that the opening of the hatch or mechanism substantially increases the activity level of the WLAN compared to a situation when the hatch or mechanism is closed, and when a stronger power saving mode is used.

Thus an aggressive WLAN power save mode is used when the hatch or mechanism is closed. As the hatches or mechanisms in this kind of terminals are closed for the most part of time, such as at night or during transport or storage, the aggressive WLAN power saving state is also used the most part of time, and the power consumption of WLAN is as low as possible. However, a terminal may react on WLAN data addressed to it, although slower than normally, even if it uses the power saving according to the invention. The device can receive data, although at a rate which is slower than normally. When a faster transmission rate for WLAN data or a more rapid reaction is required the user can leave the hatch or mechanism open, even if he would not actively use the device, or the power saving properties can be bypassed when required, for instance in a programmed way. It is also possible to switch off the WLAN system, for instance in a programmed way.

Terminals without hatches or other closing mechanisms like those described above can use other methods in order to determine the activity of WLAN or Bluetooth usage. Such methods are for instance the selection or activation of a certain application in the terminal. For instance according to one embodiment of the invention, when the menu (or other means, such as icons or like, for selecting applications, files or other objects on the user interface) of the terminal's operating system is browsed, and the browsing reaches a certain application, for example an application utilizing WLAN, it will cause a change in the activity level of the WLAN system. This anticipates a possible future need to use WLAN, as it is presumed that the application in question uses WLAN properties, and then the WLAN would already be in the active state when the application is started. The actual start of a program may then cause a further change in the WLAN system into a more active direction.

The power saving methods described above for WLAN systems may apply also on Bluetooth communication. Some further embodiments using Bluetooth will be described below. According to an embodiment a device arrangement comprises at least a first device which is a terminal of a cellular network (such as cellular phone or like described in FIGS. 2 and 3) and which also has Bluetooth features to communicate with a second device. The second device (or plurality of devices) may be a specific peripheral device which can be used for various purposes and there may be a separate peripheral device for different purposes. The second device may also be a common terminal of cellular network or like as far as it can communicate with the first device with Bluetooth.

In one embodiment there is a multipart system comprising a first device as a core unit which utilizes at least cellular phone technology and communicates with one or more peripheral devices (second device) with Bluetooth, runs one or more applications, and the User Interface (UI) in an peripheral device is implemented in a way that when the user uses the UI in a peripheral device an interaction between the peripheral unit and the core unit is required. There are several ways to divide applications between the core unit and the peripheral device UI. For example the UI applications may be located and run in the core unit and the UI is sent to peripheral device e.g. GUI bitmap is compressed and sent via Bluetooth to peripheral device where the GUI is first uncompressed and then shown to user on the display of the peripheral device. This kind method of using remote UI can be called UI casting. As the GUI may be sent every time there is a change in the bitmap, this will consume relatively much power. Common to all such methods is that usually the Bluetooth connection between the core unit and the peripheral device is required in order to fully utilize the remote UI in the peripheral device. Usually also a fast response time is required between the peripheral device and the core unit when the user is using the UI. This requires Bluetooth being in substantially active mode (e.g. not in sleep mode) when the user is using the peripheral device UI. Since there are also many other ways to divide the applications between the core unit and the peripheral devices, such as described in the following text, in this invention the expression 'remote UI' is used as a common name for these techniques wherein data related to the user interface is transferred between the first device and the second device with Bluetooth. This data may contain any data related to the user interface, such as visual data, audio data and data related to user actions. Non-limiting examples of such remote user interfaces are GUI casted from the first device to the second device as described above, an user interface based on keys, keypad, touch sensitive display or like wherein the touch entries on keys or like on one device are transferred to the other device, an user interface based on audio or combinations thereof.

The remote UI, such as UI casting, increases the current consumption because the Bluetooth link needs to be substantially active all the time when the user is actively using the system. This must be solved by developing the methods to control the power saving properties of Bluetooth.

According to another embodiment the core unit (the first device) acts as a gateway device for the peripheral devices providing access to external network resources, such as Internet or local area network or like. This connection to external network resources can be carried out through a cellular network using for example GSM, CDMA2000, GPRS, WCDMA, EDGE or UMTS technology or like. If WLAN and Bluetooth exist in the same device, WLAN can also be used as well for external network connections since it provides fast connection. The first device does not necessarily need a display or keypad or other user interface since these operations can be performed remotely on a peripheral device. For example a peripheral device may comprise a display which displays the data, such as user interface, send by the first device by Bluetooth. Such peripheral may then be a simple handheld device which does not process most of the data itself but rather the data is processed in the first device. The user interface may contain a screen saver option which either blanks the display or switches on a predefined screen saver after certain period of time. The screen saver may also be lockable, for example automatically after certain period of time or by user input.

Another example of such remote user interface is an arrangement where the actions on the keypad or like of the second device are transferred to the first device by Bluetooth i.e. the first device acts as the core unit and the second device acts as a remote keypad or like.

The second device containing display may be used for example for making phone calls, Internet browsing and email applications or like, or for imaging or music purposes, wherein the data is transferred by Bluetooth from the first device. The second device may contain a touch sensitive display or keypad or other means for user input entry or combinations thereof. The second device may also contain audio properties and devices, for example microphone, earphone or loudspeaker or combinations thereof wherein the data containing the sound information is transferred by Bluetooth. There are pluralities of purposes the second device may be used wherein the data is transferred between the first and the second device by the Bluetooth connection. The second device may also comprise combinations of properties described above or other properties.

Figure 7:
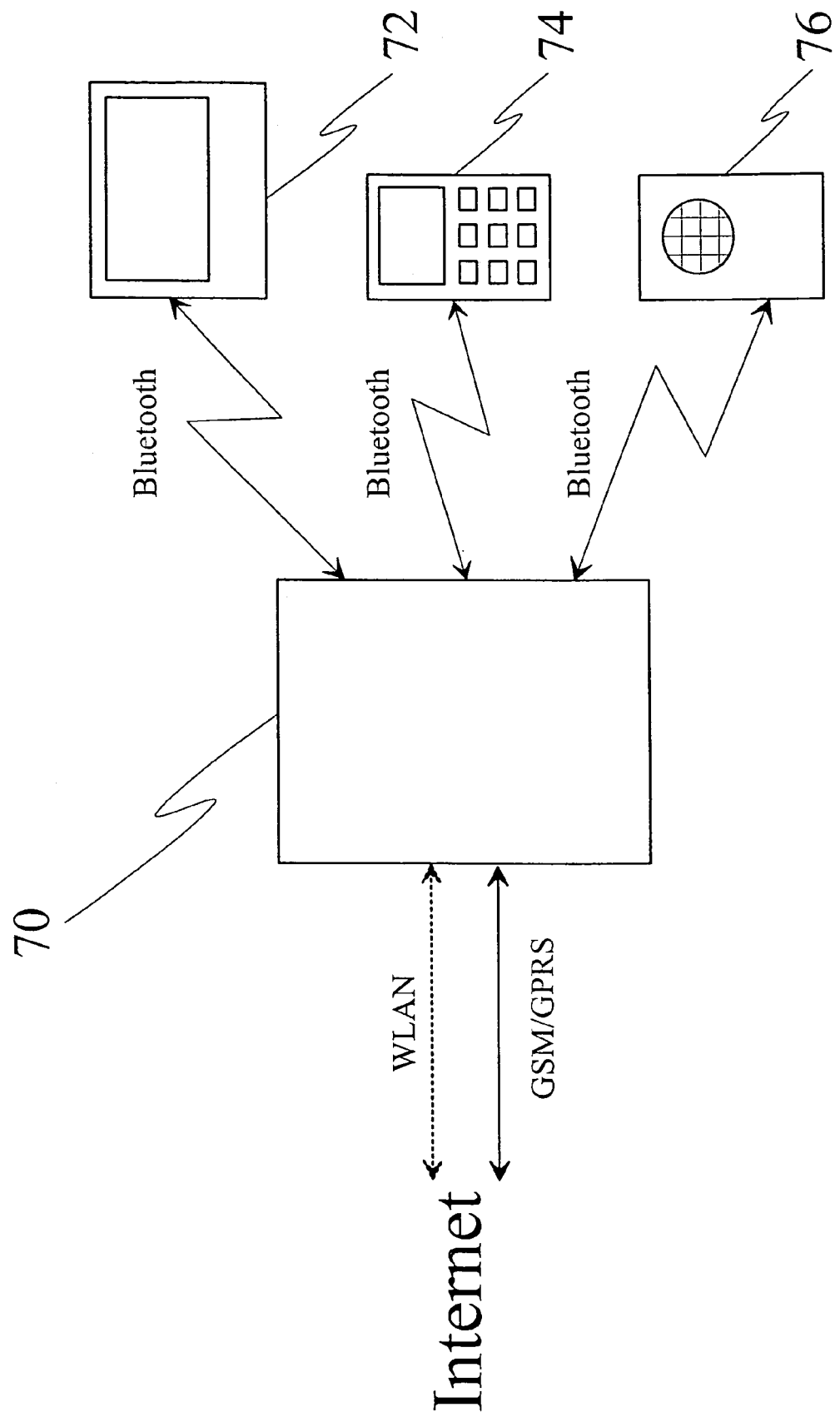
FIG. 7 shows an arrangement of a core unit and peripheral devices communicating with Bluetooth.

FIG. 7 shows an example of such device arrangement. The core unit 70 is a cellular terminal using GSM or GPRS or like to communicate with external network, such as cellular network or the Internet. Optionally the core unit can communicate also with WLAN. Further, the core unit 70 communicates with several peripheral units, 72, 74 and 76, with Bluetooth connection. In this example one peripheral unit 72 is designed for browsing and email applications and like, one 74 for conventional phone calls and one 76 for audio applications.

In an embodiment of the current invention the activity state of the user interface in the second device is arranged to control the level of the activity state of Bluetooth utilization to control the Bluetooth power save mode. A change to a higher level of power save mode is performed when said activity state of the utilization of the user interface gets lower. Correspondingly, when the activity state of the user interface gets higher, for example by user input entry, this may possible indicate a forthcoming use of Bluetooth connection and a change to a lower level of power save mode will be performed.

In an embodiment of the current invention the activity state of Bluetooth utilization, which activity controls the level of Bluetooth power save mode, is defined by the state of the keypad lock in a device as known in the art. If the keypad is locked, one can assume that the activity of the Bluetooth usage is low since user can not entry any input. This will cause a change in the power save mode so that a higher level of power save mode will be used. 'Higher level of power save mode' used herein refers to a more inactive mode regarding to the Bluetooth communication, which will save power. In one embodiment the keypad is in the peripheral device but this method can be applied also to the keypad of the first device. When the keypad lock is released, according to the invention it is likely that the usage of the Bluetooth communication will increase and the activity state of Bluetooth utilization is increased. This will cause a change in the power save mode so that a lower level of power save mode will be used. 'Lower level of power save mode' used herein refers to a more active mode regarding to the Bluetooth communication. The lowest level of power save mode will eventually be no power saving at all.

In addition to the lock state of the keypad in the second device, similarly also the lock state of a lockable touch sensitive display, which in some cases may replace the keypad or keyboard or like, or the lock state of a lockable screensaver may be used to define the activity state of Bluetooth utilization or activity state of the user interface utilization. Also as described above the state of a lid, hatch or an opening mechanism of the device may be used as well.

Similarly in another embodiment of the current invention the state of the screen saver of the display on a device defines the activity state of the Bluetooth utilization. When the screen saver is on, one can assume that the activity of the Bluetooth is low. When the screen saver is disabled, for example by user input entry by touching a touch sensitive display or a key or like, according to the invention it is likely that the activity of the Bluetooth communication will increase. The user input may be also a sound, such as a predefined specific sound, voice command or change in the volume of the sound. The device will enter to screen save mode after certain period of time. In an embodiment the lack of activity or user input for certain period of time will define the Bluetooth activity as low or lower as before. Further entering to screen saver mode will define the Bluetooth activity even lower.

In an embodiment the state of the user interface utilization is defined by user input on the second device or lack of it for a chosen period of time. Generally any user input, such as touch on a key or a specific key on the keypad or like, touch on a touch sensitive display, touching or moving a lid, hatch or an opening mechanism of the device or providing a specific sound or change in the level of sound, may be used to define the activity state of the Bluetooth utilization.

When the activity of the Bluetooth is low or it is not actively used, the second (peripheral) device informs the first device with Bluetooth and the first device increases the sleep period for example by going from connected mode to sleep mode or by increasing the sniff interval (higher power save mode). Depending on the settings of the power saving the Bluetooth connection with the second device may go also to hold mode or park mode. On the other hand if second device detects an user input, for example as described above, this is noticed by the first device and the sleep period is increased (e.g. from sniff mode to connected mode or sniff interval is increased) or more lower power save mode is selected.

Using these principles the devices may save power when the Bluetooth connection is not in active use. Also when a user input is detected, the activity state of the Bluetooth will get higher to allow faster responses to further user actions, for example for the use of the user interface.

In an example the first device communicates with at least two devices of 'second device' type. When the keypad of one of said 'second devices' is locked, said device will enter a power save mode wherein the sniff interval is increased. If at the same time the first device communicates actively with another 'second device', said entering of the other device to the power save mode will free resources for this active communication and the capacity of said communication may increase.

According to an embodiment of the invention the method for determining the activity of WLAN or Bluetooth utilization and the setting the level of the power save mode is to monitor the level of WLAN or Bluetooth communication during a certain period. If no data has been transmitted during a certain time through the WLAN or Bluetooth, or if only a small amount of data has been transmitted, then the WLAN or Bluetooth system would switch into the power save mode, and the interval between received beacons would become longer. On the other hand, an increased amount of transmitted data would cause the WLAN or Bluetooth to switch into a more active state (lower power save mode).

In one embodiment the second device displays the user interface, which may contain menu or icons or like, and user can browse this menu locally on the second device without any data being sent by Bluetooth to the first device. When a certain application, preferably associated with higher Bluetooth utilization between the devices, is chosen in the menu or display, it will cause a change in the level of the Bluetooth power save mode. The Bluetooth will go on more active mode to enable faster responses for said application utilizing Bluetooth.

Above some methods according to the invention are described. The invention is not limited to the solutions described above, but the inventive idea can be applied in numerous ways within the scope of the claims.

The invention claimed is:

1. An apparatus comprising:
   at least one processor; and
   at least one memory including computer program code, where the at least one memory and the computer program code are configured, with the at least one processor, to cause the apparatus to at least:
   communicate in a short range radio network;
   receive from a second apparatus a representation of a graphical user interface of the second apparatus;
   display, on the apparatus, the representation of the graphical user interface of the second apparatus, wherein the representation of the graphical user interface displayed on the apparatus is utilized by the apparatus to at least access external network resources, via the short range radio network, using the second apparatus;
   detect an activity state of the utilization of the representation of the graphical user interface by the apparatus; and
   send detected activity state information via the short range radio network to the second apparatus.

2. The apparatus of claim 1, wherein said activity state of the utilization of the representation of the graphical user interface is defined by at least one of: a lock state of a lockable keypad, a lock state of a lockable touch sensitive display, a state of a screensaver, a lock state of a lockable screensaver, and a state of a lid or an opening mechanism of the apparatus.

3. The apparatus of claim 1, wherein said activity state of the utilization of the representation of the graphical user interface is defined by at least one of an input on the apparatus and lack of an input for a period of time.

4. The apparatus of claim 3, wherein said input is received by at least one of: a touch on a key, keypad or touch sensitive display, opening or closing of a lid or an opening mechanism of the apparatus, or a specific sound input on the apparatus.

5. The apparatus of claim 1, wherein said activity state of the utilization of the representation of the graphical user interface is defined by at least one of selecting and starting an application using the short range radio network.

6. The apparatus of claim 1, wherein the short range radio network comprises a Bluetooth network.

7. The apparatus of claim 5, wherein the at least one of selecting and starting the application is performed using a menu displayed on the representation of the graphical user interface.

8. The apparatus of claim 1, wherein a representation of the graphical user interface of the second apparatus, which replaces the representation of the graphical user interface displayed on the apparatus, is received when the graphical user interface of the second apparatus changes.

9. The apparatus of claim 1, wherein the external network resources comprise at least one of an internet, a global system for mobile communication, a code division multiple access, a general packet radio services, a wideband code division multiple access, an enhanced data rates for global evolution, and a universal mobile telecommunications system resource.

10. The apparatus of claim 1, wherein the representation of the graphical user interface displayed on the apparatus is utilized by the apparatus for at least one of placing calls, Internet access, accessing email, and listening to music, via the short range radio network, using the second apparatus.

11. A method comprising:
   communicating in a short range radio network;
   receiving, at a first apparatus, from a second apparatus a representation of a graphical user interface of the second apparatus;
   displaying, on the first apparatus, the representation of the graphical user interface of the second apparatus, wherein the representation of the graphical user interface displayed on the first apparatus is utilized by the first apparatus to at least access external network resources, via the short range radio network, using the second apparatus;
   detecting an activity state of the utilization of the representation of the graphical user interface by the first apparatus; and
   sending detected activity state information via the short range radio network to the second apparatus.

12. The method of claim 11, wherein said activity state of the utilization of the representation of the graphical user interface is defined by at least one of: a lock state of a lockable keypad, a lock state of a lockable touch sensitive display, a state of a screensaver, a lock state of a lockable screensaver, and a state of a lid or an opening mechanism of the first apparatus.

13. The method of claim 11, wherein said activity state of the utilization of the representation of the graphical user interface is defined by at least one of an input on the first apparatus and lack of an input for a period of time.

14. The method of claim 13, wherein said input is received by at least one of: a touch on a key, keypad or touch sensitive display, opening or closing of a lid or an opening mechanism of the first apparatus, or a specific sound input on the first apparatus.

15. The method of claim 11, wherein said activity state of the utilization of the representation of the graphical user interface is defined by at least one of selecting and starting an application using the short range radio network.

16. The method of claim 11, wherein the short range radio network comprises a Bluetooth network.

17. The method of claim 15, wherein the at least one of selecting and starting the application is performed using a menu displayed on the representation of the graphical user interface.

18. The method of claim 11, wherein a representation of the graphical user interface of the second apparatus, which replaces the representation of the graphical user interface displayed on the first apparatus, is received when the graphical user interface of the second apparatus changes.

19. The method of claim 11, wherein the external network resources comprise at least one of an internet, a global system for mobile communication, a code division multiple access, a general packet radio services, a wideband code division multiple access, an enhanced data rates for global evolution, and a universal mobile telecommunications system resource.

20. The method of claim 11, wherein the representation of the graphical user interface displayed on the first apparatus is utilized by the first apparatus for at least one of placing calls, Internet access, accessing email, and listening to music, via the short range radio network, using the second apparatus.

21. A non-transitory computer-readable medium that contains software program instructions, wherein execution of the software program instructions by at least one data processor results in performance of operations that comprise execution of the method according to claim 11.

* * * * *